(12) United States Patent
Lah

(10) Patent No.: US 8,832,910 B2
(45) Date of Patent: Sep. 16, 2014

(54) LOCKING DEVICE FOR POLE

(76) Inventor: Jeh-Kun Lah, Seoul (KR)

( * ) Notice: Subject to any disclaimer, the term of this patent is extended or adjusted under 35 U.S.C. 154(b) by 118 days.

(21) Appl. No.: 13/480,660

(22) Filed: May 25, 2012

(65) Prior Publication Data

US 2013/0312231 A1  Nov. 28, 2013

(51) Int. Cl.
*F16B 2/10* (2006.01)
*A63C 11/22* (2006.01)
*F16B 7/14* (2006.01)

(52) U.S. Cl.
CPC ............ *F16B 7/1418* (2013.01); *A63C 11/221* (2013.01)
USPC ........................ 24/457; 24/19; 24/273; 24/284

(58) Field of Classification Search
USPC ............... 24/457, 19, 284, 273; 16/427, 429, 16/113.1, DIG. 24, DIG. 25; 285/358, 373, 285/420, 112, 413, 311, 309, 312; 15/144.4
See application file for complete search history.

(56) References Cited

U.S. PATENT DOCUMENTS

| | | | | | |
|---|---|---|---|---|---|
| 249,766 | A | * | 11/1881 | Hunt | 285/358 |
| 939,931 | A | * | 11/1909 | Towle | 285/8 |
| 1,110,011 | A | * | 9/1914 | Schneider | 285/114 |
| 1,970,078 | A | * | 8/1934 | Dillon | 285/18 |
| 2,009,046 | A | * | 7/1935 | Fons | 138/99 |
| 2,038,766 | A | * | 4/1936 | Simmons | 285/358 |
| 2,463,235 | A | * | 3/1949 | Andrews | 285/105 |
| 3,705,737 | A | * | 12/1972 | Westerlund et al. | 285/365 |
| 4,497,092 | A | * | 2/1985 | Hoshino | 24/514 |
| 4,643,460 | A | * | 2/1987 | Lieberg | 285/112 |
| 4,744,690 | A | * | 5/1988 | Hsieh | 403/104 |
| 4,867,482 | A | * | 9/1989 | Hendrickson | 285/12 |
| 4,966,395 | A | * | 10/1990 | Hendrickson | 285/12 |
| 5,366,263 | A | * | 11/1994 | Hendrickson | 285/364 |
| 5,380,052 | A | * | 1/1995 | Hendrickson | 285/364 |
| 5,441,307 | A | * | 8/1995 | Quintana et al. | 280/823 |
| 5,478,117 | A | * | 12/1995 | Quintana et al. | 280/823 |
| 7,244,070 | B2 | * | 7/2007 | Burnett et al. | 396/420 |
| 7,288,117 | B2 | * | 10/2007 | Benson | 623/38 |
| 2004/0101351 | A1 | * | 5/2004 | Pitcher | 403/109.5 |
| 2005/0126612 | A1 | * | 6/2005 | Chen | 135/16 |
| 2007/0052239 | A1 | * | 3/2007 | Dole | 285/420 |
| 2007/0108756 | A1 | * | 5/2007 | Laakso et al. | 280/823 |
| 2010/0170547 | A1 | * | 7/2010 | Pietrzak et al. | 135/75 |
| 2011/0042539 | A1 | * | 2/2011 | Melic | 248/354.7 |
| 2011/0240078 | A1 | * | 10/2011 | Lenhart et al. | 135/75 |
| 2012/0305041 | A1 | * | 12/2012 | Lah et al. | 135/75 |
| 2012/0324682 | A1 | * | 12/2012 | Ballentine | 24/535 |

* cited by examiner

*Primary Examiner* — Robert J Sandy
*Assistant Examiner* — Caroline L Natirboff
(74) *Attorney, Agent, or Firm* — Nixon Peabody LLP; Jeffrey L. Costellia

(57) ABSTRACT

The present invention relates to a locking device for a pole, including: a grasping tube having incision portions; operating pins adapted to be inserted in an up and down direction into upper and lower pressing parts; and an axial lever having a pressing plate extended in the lengthwise direction of the pole.

8 Claims, 14 Drawing Sheets

LOCKING DEVICE FOR POLE

BACKGROUND OF THE INVENTION

1. Field of the Invention

The present invention relates to a locking device for a pole that performs a locking operation through an axial lever, and more particularly, to a locking device for a pole wherein an axial lever is disposed in the lengthwise direction of the pole to apply a clamping force to both left and right sides of upper and lower connection tubes in the radial direction, thereby requiring a relatively small operating force, increasing a locking force, and allowing fine adjustment in the locking force to be carried out.

2. Background of the Related Art

Generally, poles such as hiking poles, sports game poles, patient's walking assistant poles, and the like are used as auxiliary means for supporting a user's body. The pole is provided with a pole body and a handle connected to the end of the pole body. The pole body is generally formed by insertedly coupling a plurality of connection tubes in such a manner as to be foldable or extendable in the lengthwise direction while being kept or in use, which is called 'telescoping pole' or 'antenna pole'.

A locking device for the pole is adapted to lock two neighboring connection tubes in a state where the plurality of connection tubes are extended or folded, and FIGS. 1 to 3 show a conventional lever type locking device that is capable of being operated easily by women or old people.

As shown in FIGS. 1 to 3, the conventional lever type locking device 10 is mounted on the end periphery of an upper connection tube 2 having a larger diameter than a lower connection tube 4 and has a grasping circle member 20 contracted by the manipulation of a cam lever 40 to allow the lower connection tube 4 to be fixedly clamped thereto.

The grasping circle member 20 of the locking device 10 is divided only on one side in the circumferential direction into upper and lower parts by means of an incised part 22, and the incised part 22 have extension plates 24 extended from the upper and lower portions thereof. An operating pin 30 is passed through the upper and lower extension plates 24 in such a manner as to be coupled to the cam lever 40 by means of a hinge pin 50, and the cam lever 40 has a cam face 42 formed thereon.

Referring to FIG. 3, the locking device 10 is in detail described, and if the cam lever 40 is pressed toward the grasping circle member 20, the cam face 42 is rotated to pull the operating pin 30. Thus, the upper and lower extension plates 24 are pulled to clamp the grasping circle member 20, which allows the lower connection tube 4 to be pressurized and fixed.

According to the conventional locking device 10, by the way, the cam lever 40 is rotated in the radial direction of the upper and lower connection tubes 2 and 4 and has a bent shape corresponding to the arches of the upper and lower connection tubes 2 and 4.

As a result, there is a limit in extending the whole length of the cam lever 40, which fails to exert a sufficient locking force, and further, a substantially large locking force should be needed when the locking is carried out, which really makes it for old people or women to do that. Especially, as shown in FIG. 2, pressing the end portion of the cam lever 40 does not exert its locking force sufficiently due to the relation between the end point of the cam lever 40 and the position of the hinge pin 50 and the shape of the arch of the cam lever 40. Accordingly, since the pressed portion of the cam lever 40 for locking operation 40 is formed on the intermediate portion thereof, the cam lever has a very short length operating as a lever, thereby failing to provide sufficient effects as the lever which is an important part of the lever type locking device.

Further, the grasping circle member 20 is incised only on one side thereof and is clamped only the incised side, so that the force for pressurizing the lower connection tube 4 is not applied uniformly to the entire circumferential surface of the lower connection tube 4. In addition, the arch length of the grasping circle member 20 is substantially long, so that the grasping circle member 20 is undesirably likely to be loose when pressurizing the lower connection tube 4. Accordingly, the grasping circle member 20 is not clamped strongly, thereby providing no sufficient locking force, and besides, the locking force is drastically decreased due to the repeated uses.

Moreover, as appreciated from FIG. 3, the contact point between the cam face 42 and the upper extension plate 24 when the cam lever 40 is in a locking state is far radial direction from the center of the grasping circle member 20, so that the force for pulling the upper and lower extension plates 24 is lost mostly before applied to the grasping circle member 20.

SUMMARY OF THE INVENTION

Accordingly, the present invention has been made in view of the above-mentioned problems occurring in the prior art, and it is an object of the present invention to provide a locking device for a pole which is capable of requiring a relatively small operating force, greatly increasing a locking force, and maintaining good durability in spite of repeated uses.

It is another object of the present invention to provide a locking device for a pole which is capable of conducting fine adjustment in a locking force.

To accomplish the above objects, according to a first aspect of the present invention, there is provided a locking device for a pole, the pole having a plurality of connection tubes slidably coupled to each other in the lengthwise direction thereof, wherein the lower connection tube having a relatively smaller diameter than the upper connection tube in the two neighboring connection tubes is slidably inserted into the upper connection tube in such a manner as to be locked to upper connection tube or released from the locked state, the locking device including: a grasping tube having a body coupled to the end periphery of the upper connection tube, incision portions formed at the left and right sides in the radial direction in such a manner as to provide an upper arch-shaped grasping piece and a lower arch-shaped grasping piece formed independently on the upper and lower portions thereof, and upper and lower pressing parts extended outwardly from both sides of each of the upper arch-shaped grasping piece and the lower arch-shaped grasping piece; operating pins adapted to be inserted in an up and down direction into through-holes formed on the upper and lower pressing parts formed on both left and right sides of the upper arch-shaped grasping piece and the lower arch-shaped grasping piece; and an axial lever having a pressing plate extended in the lengthwise direction of the pole and a cam type hinge part formed on the end portion of the pressing plate in such a manner as to be hinge-coupled to the upper protruded end portions of the operating pins to a state of being rotated in the lengthwise direction of the pole.

To accomplish the above objects, according to a second aspect of the present invention, there is provided a locking device for a pole, the pole having a plurality of connection tubes slidably coupled to each other in the lengthwise direction thereof, wherein the lower connection tube having a relatively smaller diameter than the upper connection tube in the two neighboring connection tubes is slidably inserted into the upper connection tube in such a manner as be locked to the upper connection tube or released from the locked state, the locking device including: a grasping tube having a body coupled to the end periphery of the upper connection tube, incision portions formed at the left and right sides in the radial direction thereof in such a manner as to provide an upper arch-shaped grasping piece and a lower arch-shaped grasping piece formed independently on the upper and lower portions thereof, and upper and lower pressing parts extended outwardly from both sides of each of the upper arch-shaped grasping piece and the lower arch-shaped grasping piece, the upper and lower pressing parts formed on each of both left and right sides thereof having through-holes formed to be passed in an up and down direction therethrough; operating pins each adapted to be inserted in an up and down direction into through-holes formed on the upper and lower pressing parts; and an axial lever having a pressing plate extended in the lengthwise direction of the pole and a cam type hinge part extended from the pressing plate in such a manner as to be hinge-coupled to the upper protruded end portions of the operating pins to a state of being rotated in the lengthwise direction of the pole.

According to the present invention, desirably, each operating pin includes an upper pin adapted to be slidably inserted into the through-holes of the upper and lower pressing parts the grasping tube in an up and down direction and having upper end portions hinge-coupled to the axial lever, and an adjusting screw adapted to be inserted upwardly into the through-holes of the upper and lower pressing parts in such a manner as to be screw-coupled to the upper pin, the adjusting screw having a head locked to the lower pressing part.

According to the present invention, desirably, the grasping tube has loosening prevention pads fixedly disposed to the top surfaces of the lower pressing parts thereof in such a manner as to elastically restrict the outer peripheral surfaces of the adjusting screws and to prevent the adjusting screws from being unfastened.

According to the present invention, desirably, each loosening prevention pad includes a base fixed to the top surface of each lower pressing part and elastic protrusions formed in the middle portion of the base to elastically pressurize the outer peripheral surface of each adjusting screw.

According to the present invention, desirably, the grasping tube has an incised slot formed on the left and right sides between the body and the upper and lower arch-shaped grasping pieces.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a locking device for a pole according to preferred embodiments of the present invention will be in detail given with reference to the attached drawings.

Figure 1:
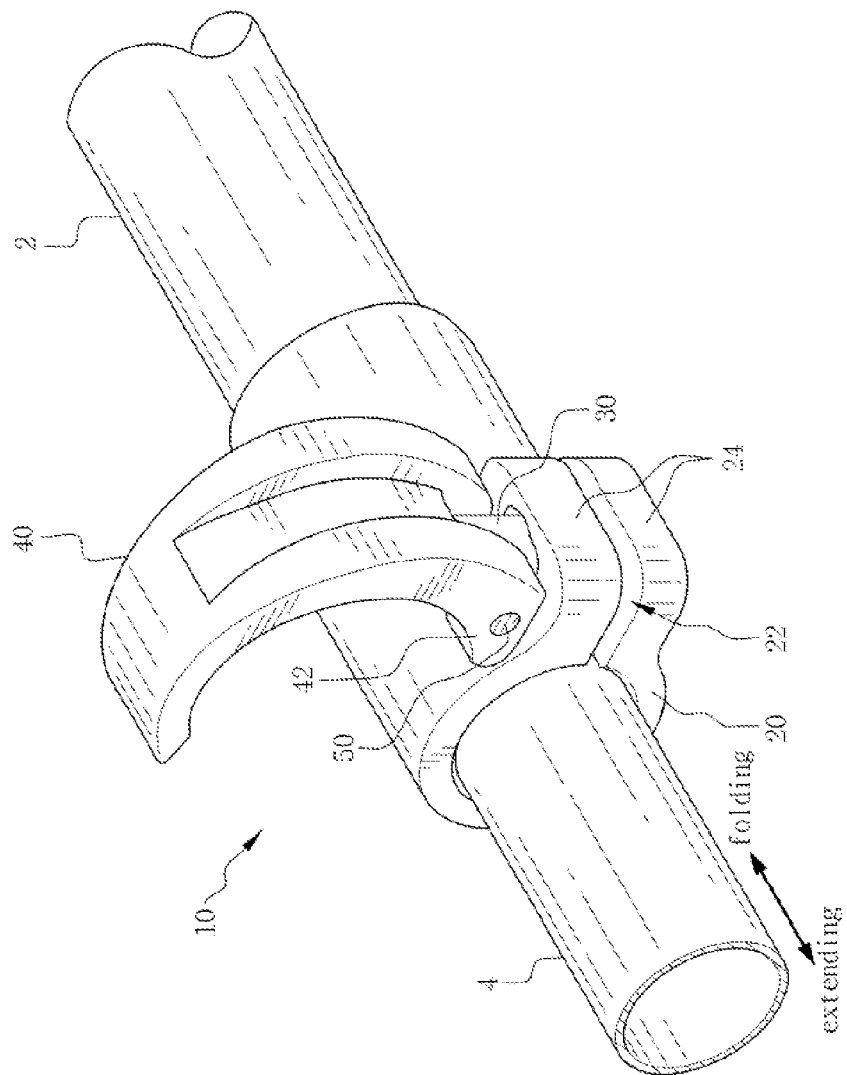
FIG. 1 is a perspective view showing a locking device for a pole in a conventional practice.
Figure 2:
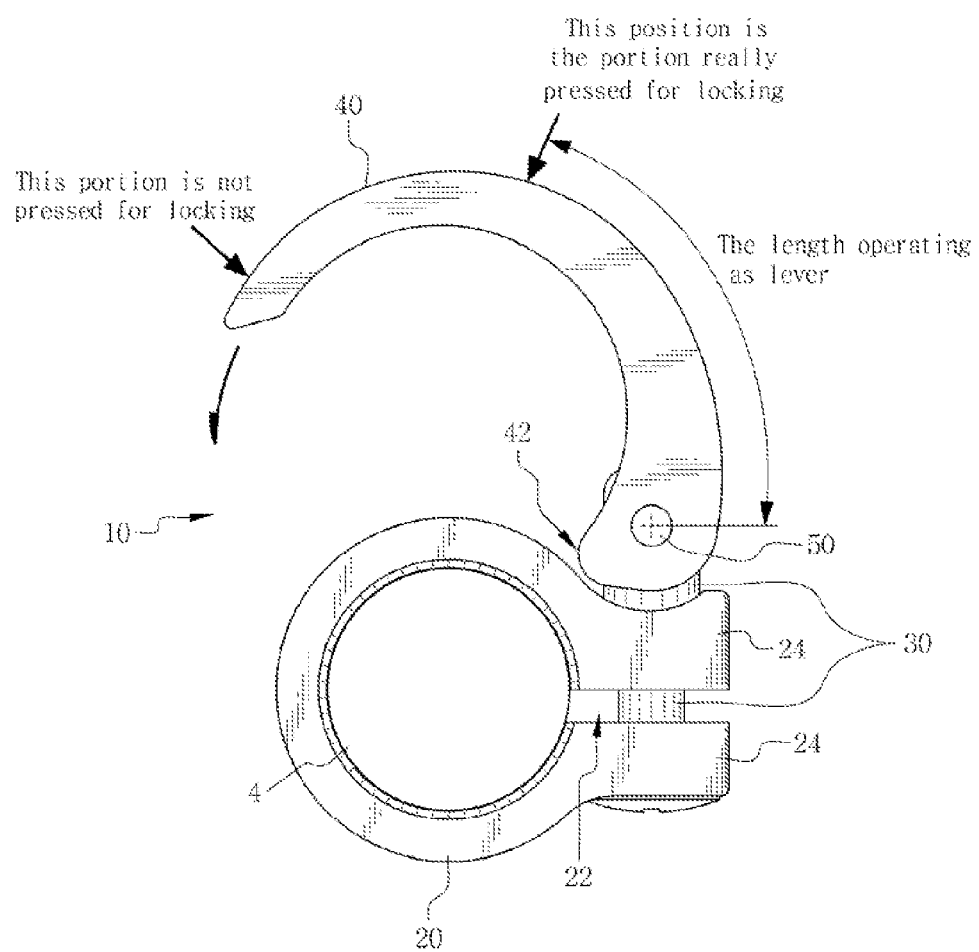
FIG. 2 is a side view showing the conventional locking device for a pole being in a releasing state from a locking state thereof.
Figure 3:
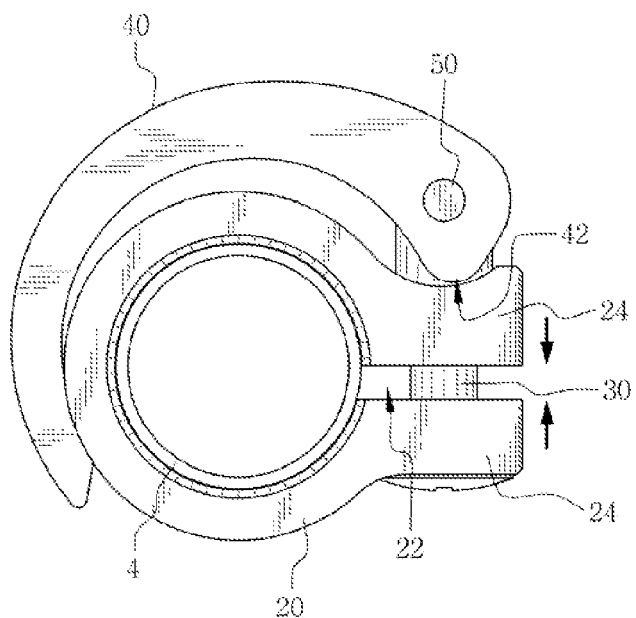
FIG. 3 is a side view showing the conventional locking device for a pole being in the locking state.
Figure 4:
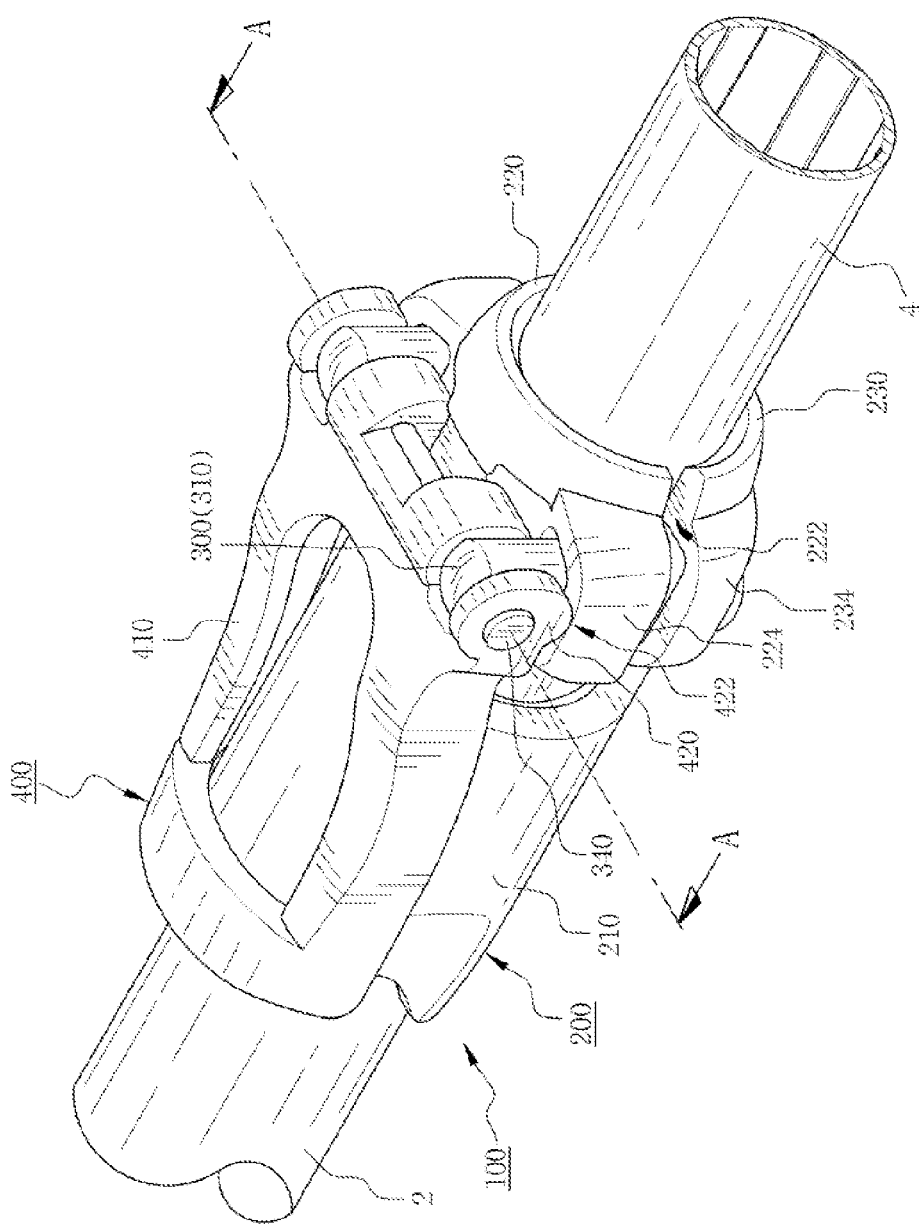
FIG. 4 is a perspective view showing a locking device for a pole according to a first embodiment of the present invention.
Figure 5:
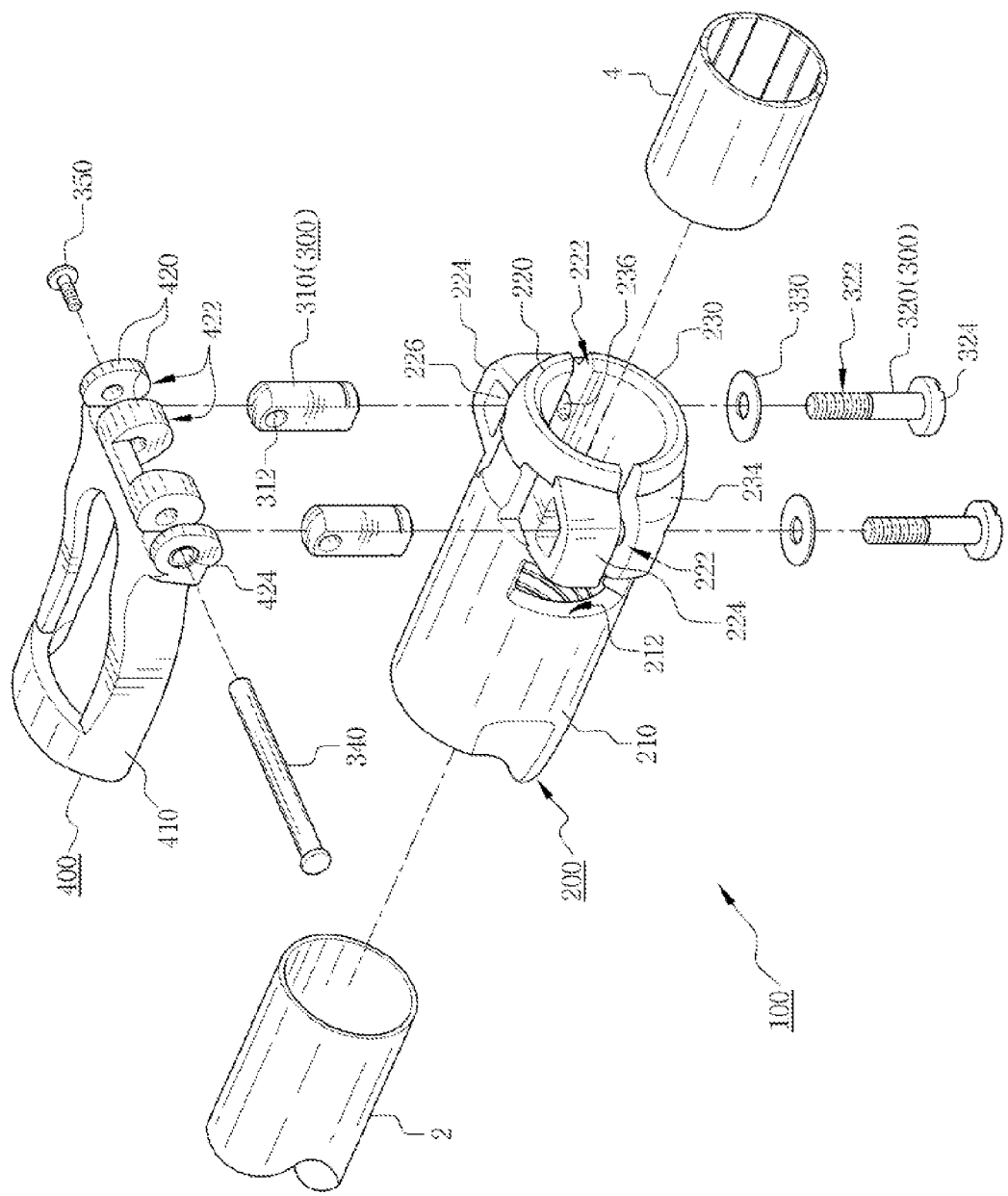
FIG. 5 is an exploded perspective view showing the locking device for the pole according to the first embodiment of the present invention.
Figure 6:
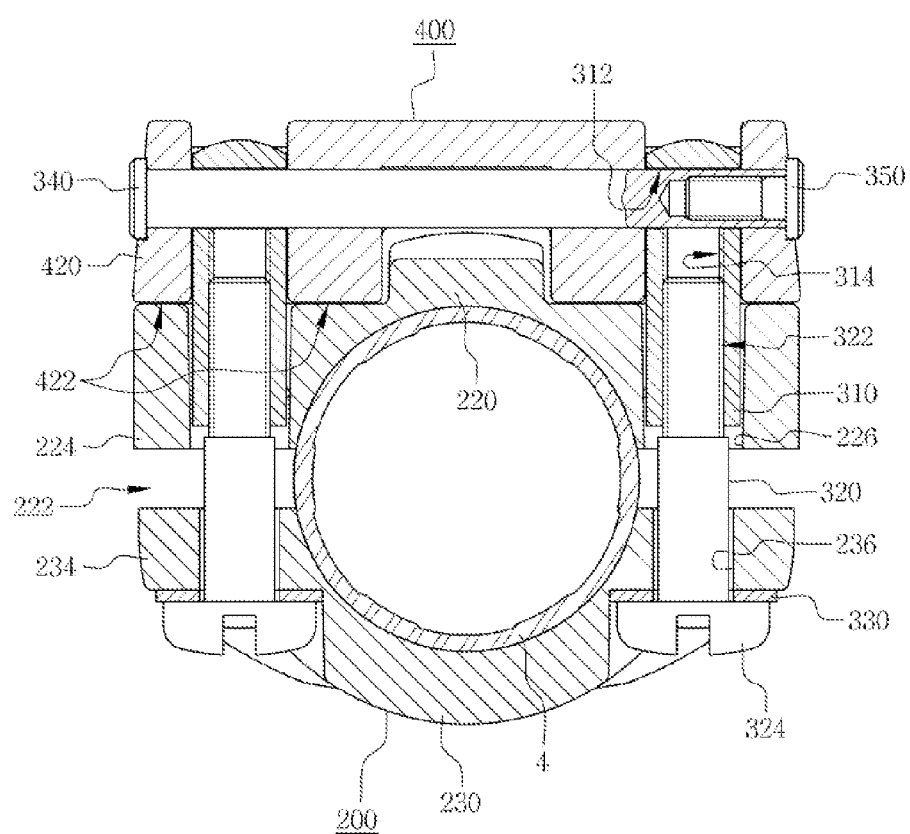
FIG. 6 is a sectional view taken along the line A-A of FIG. 4.

As shown in FIGS. 4 to 6, a locking device 100 for a pole according to a first embodiment of the present invention is mounted on the end peripheral surface of an upper connection tube 2 having a large diameter, and an axial lever 400 is rotated to fix a lower connection tube 4 having a smaller diameter than the upper connection tube 2 or to release the fixed state.

According to the first embodiment of the present invention, the locking device 100 includes: a grasping tube 200 having incision portions 222 formed at the left and right sides in the radial direction thereof in such a manner as to provide an upper arch-shaped grasping piece 220 and a lower arch-shaped grasping piece 230 formed independently on the upper and lower portions thereof; operating pins 300 adapted to be passed in an up and down direction through both sides of the upper arch-shaped grasping piece 220 and the lower arch-shaped grasping piece 230; and the axial lever 400 adapted to be fastened to the operating pins 300 in such a manner as to be rotated in the lengthwise direction of the pole.

The upper arch-shaped grasping piece 220 and the lower arch-shaped grasping piece 230 are extended from a body 210 of the grasping tube 200, and the body 210 is fixedly coupled to the upper connection tube 2. An incised slot 212 is formed on the left and right sides between the body 210 and the upper and lower arch-shaped grasping pieces 220 and 230, respectively, so that the upper arch-shaped grasping piece 220 and the lower arch-shaped grasping piece 230 can be contracted well.

The upper arch-shaped grasping piece 220 and the lower arch-shaped grasping piece 230 of the grasping tube 200 have upper and lower pressing parts 224 and 234 extended outwardly from both sides thereof, and the upper and lower pressing parts 224 and 234 have through-holes 226 and 236 formed in an up and down direction thereon.

The operating pins 300 are inserted upwardly into the through-holes 226 and 236 of the upper and lower pressing parts 224 and 234, and the upper end portions thereof are protruded upwardly from the upper pressing parts 224. The protruded end portions of the operating pins 300 are hinge-coupled to the cam type axial lever 400. The operating pins 300 are moved in upward and downward directions in accordance with the cam type rotation of the axial lever 400, thereby fastening or unfastening the upper and lower pressing parts 224 and 234.

The operating pins 300 are desirably varied in length to adjust a locking force. Thus, each of the operating pins 300 is comprised of an upper pin 310 and an adjusting screw 320 screw-coupled to each other. The upper pin 310 and the adjusting screw 320 are coupled to each other by means of a first screw part 314 (See FIG. 6) and a second screw part 322. If the whole lengths of the operating pins 300 are varied by the adjustment of the first and second screw parts 314 and 322, the fastening quantities, that is, the fastening forces of the upper and lower pressing parts 224 and 234 are increased or decreased. A head 324 of the adjusting screw 320 comes into close contact with the lower pressing part 234. A washer 330 is interposed between the head 324 of the adjusting screw 320 and the lower pressing part 234.

The upper protruding end portion of each operating pin 300, that is, the protruding end portion of the upper pin 310 has a hinge hole 312 formed thereon in such a manner as to be hinge-coupled to the axial lever 400.

The axial lever 400 has a pressing plate 410 extended in the lengthwise direction of the pole. The pressing plate 410 has an arch-shaped cross section to appropriately cover the outer peripheral surface of the upper connection tube 2. The pressing plate 400 has a cam type hinge part 420 formed on the end portion thereof, and the cam type hinge part 420 has coupling holes 424 formed thereon. Cam surfaces 422 are convexedly formed around the coupling hole 424.

A hinge pin 340 is slidingly and rotatably inserted into the coupling holes 424 of the cam type hinge part 420 and the hinge holes 312 of the operating pins 300. For the assembly of the hinge pin 340, a fixing screw 350 is desirably fastened to the end portion of the hinge pin 340 passed through the coupling holes 424.

According to the first embodiment of the present invention, like this, since the axial lever 400 is disposed in the lengthwise direction of the pole, it can be increased in length as long as possible and can be also extended straightly in the axial direction, while being not bent in the direction where a force is applied, so that the force applied to the axial lever 400 is transmitted completely to the upper arch-shaped grasping piece 220 and the lower arch-shaped grasping piece 230, thereby allowing the locking device 100 to be locked or unlocked with ease by women or old people.

Further, the grasping tube 200 is divided into two upper and lower semicircular parts, that is, the upper arch-shaped grasping piece 220 and the lower arch-shaped grasping piece 230, and on the other hand, the cam type axial lever 400 pulls the operating pins 300 from the left and right sides in the radial direction to clamp the upper arch-shaped grasping piece 220 and the lower arch-shaped grasping piece 230 thereagainst, so that the outer peripheral surface of the lower connection tube 4 can be compressed in uniform and balanced manners, thereby greatly increasing the locking force.

Further, the upper arch-shaped grasping piece 220 and the lower arch-shaped grasping piece 230, which come into close contact with the lower connection tube 4, are decreased in their arch lengths (to half of the conventional length), and even if a large locking force is applied, they are not easily expanded, thereby allowing the locking force to be sufficiently increased and also improving the durability.

Furthermore, the operating pins 300 and the pressing parts 224 and 234 are disposed on both sides in the radial direction, and also, the cam surfaces 422 are rotated in the lengthwise direction of the pole, so that the point of the application of the force is nearer from the center shafts of the connection tubes 2 and 4 when compared with the conventional practices, thereby greatly improving the locking force. Also, even if the locking force is increased, the upper and lower pressing parts 224 and 234 are not likely to be deformed.

Moreover, the lengths of the operating pins 300 are increased and decreased by means of the screw-coupling of the upper pins 310 and the adjusting screws 320, thereby making it convenient to adjust the locking force.

FIGS. 7 to 10 show the locking and releasing states of the locking device 100. The locking and releasing processes will be briefly described with reference to FIGS. 7 to 10.

Figure 7:
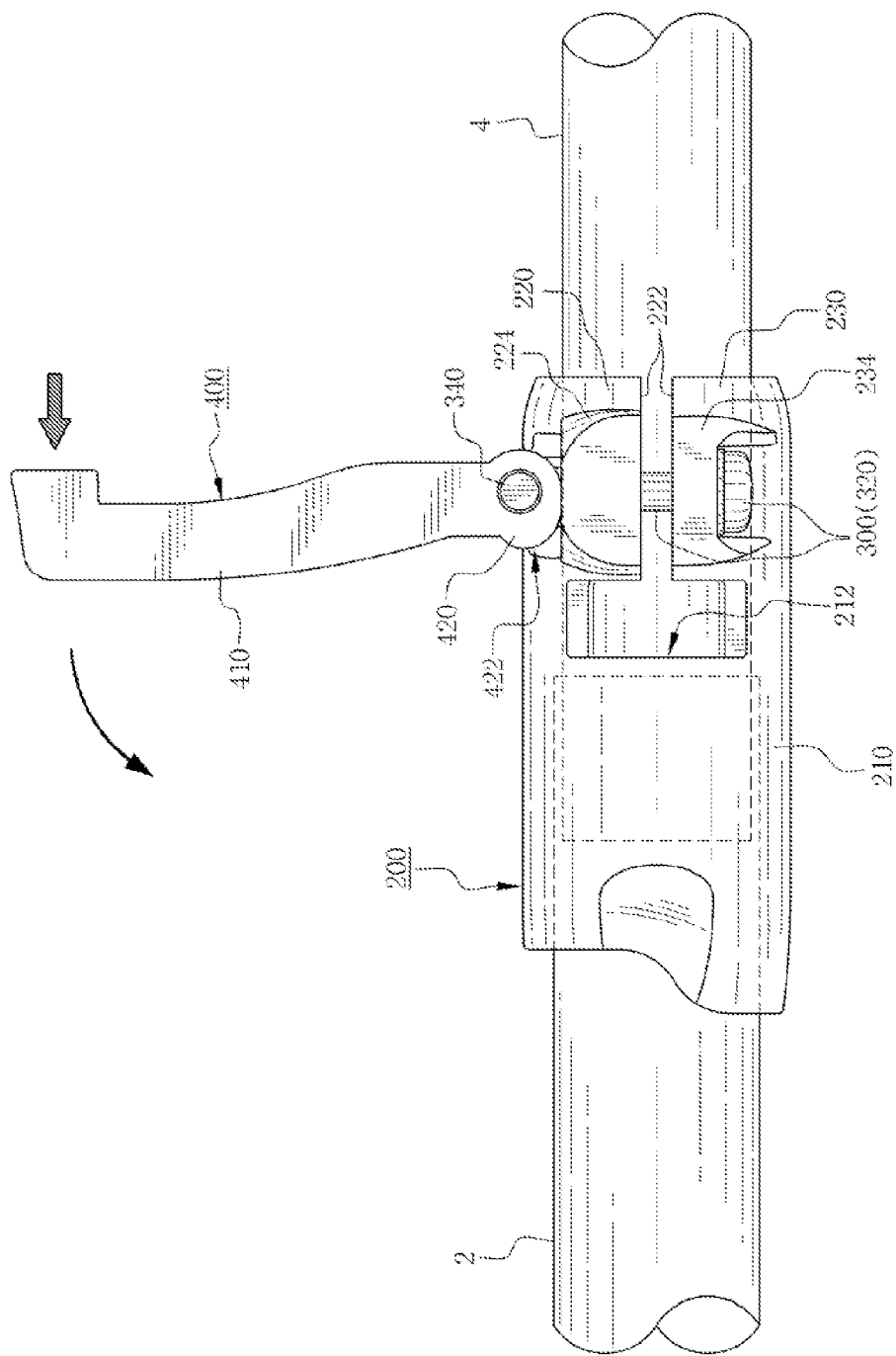
FIG. 7 is an exemplary view showing the locking device for the pole according to the first embodiment of the present invention, which is in a releasing state.
Figure 8:
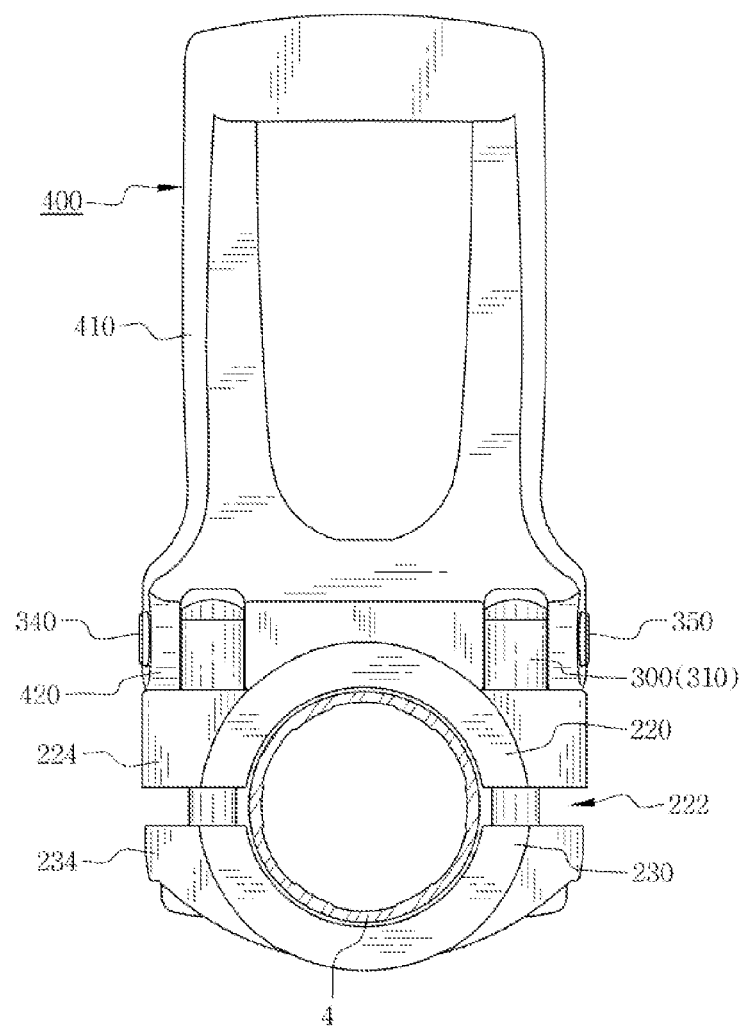
FIG. 8 is a side view of FIG. 7.

First, as shown in FIGS. 7 and 8, in a state where the axial lever 400 is lifted up, the cam surfaces 422 of the cam type hinge part 420 are escaped from the upper pressing parts 224, so that the upper and lower pressing parts 224 and 234 are expanded to their original shapes. Thus, a gap is formed between the upper arch-shaped grasping piece 220 and the lower arch-shaped grasping piece 230 and the lower connection tube 4, so that the lower connection tube 4 is free from the locked state in such a manner as to be pushed into or drawn from the upper connection tube 2.

Figure 9:
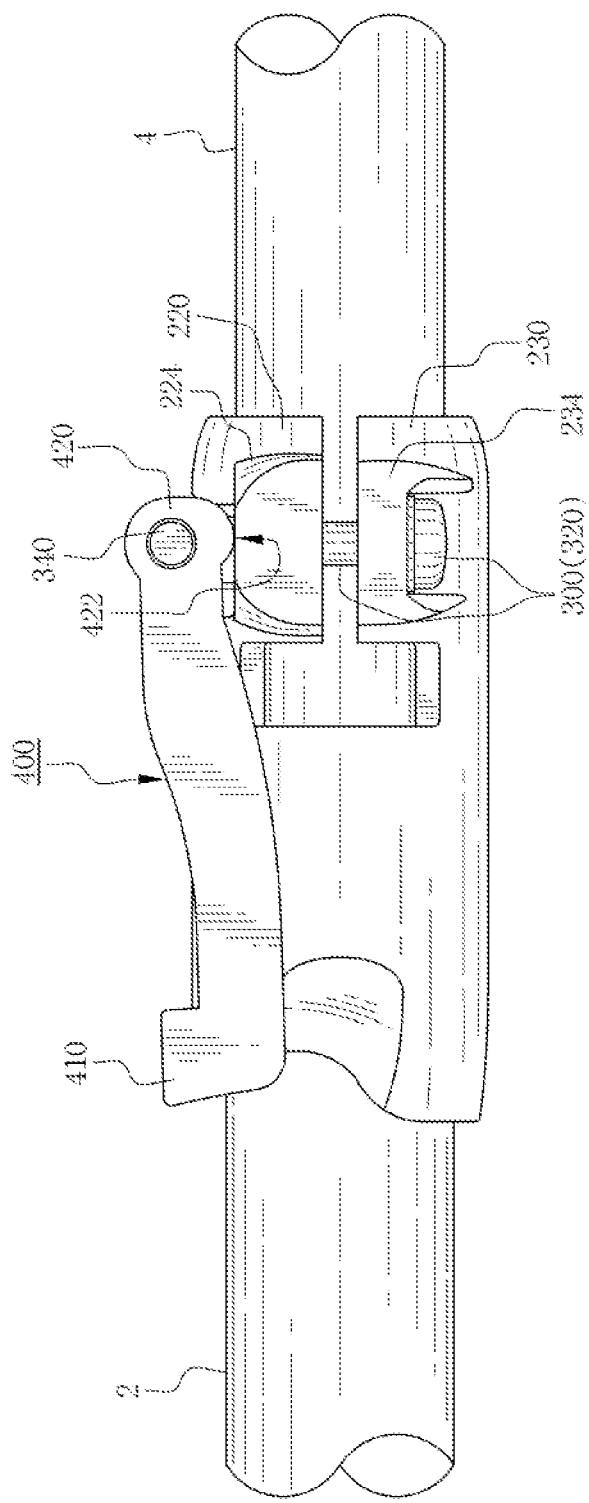
FIG. 9 is an exemplary view showing the locking device for the pole according to the first embodiment of the present invention, which is in a locking state.
Figure 10:
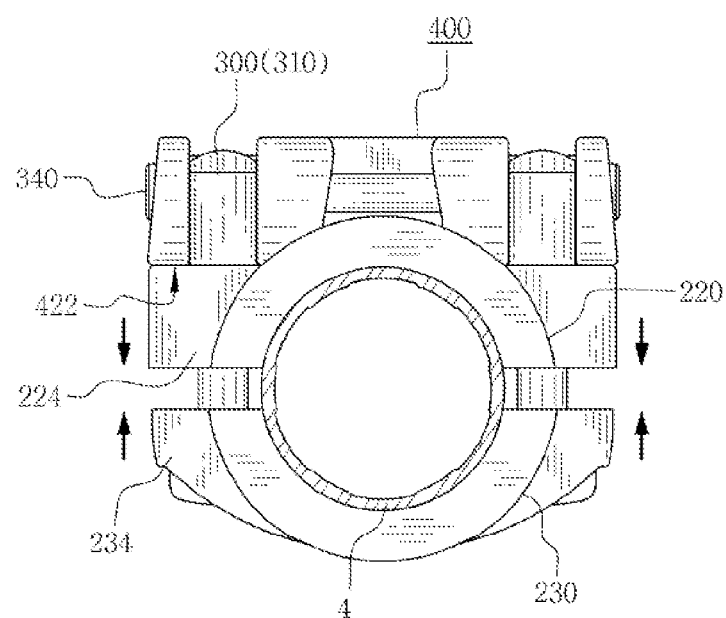
FIG. 10 is a side view of FIG. 9.

If the axial lever 400 is rotated to the direction of an arrow (in the locking direction) as shown in FIGS. 8 and 9, it becomes in the state as shown in FIGS. 9 and 10. That is, the cam surfaces 422 of the axial lever 400 are rotated to correspond with the center shafts of the operating pins 300 to pull the operating pins 300, and thus, the space between the upper and lower pressing parts 224 and 234 becomes narrow, so that the upper arch-shaped grasping piece 220 and the lower arch-shaped grasping piece 230 lockingly pressurize the outer peripheral surface of the lower connection tube 4.

Figure 11:
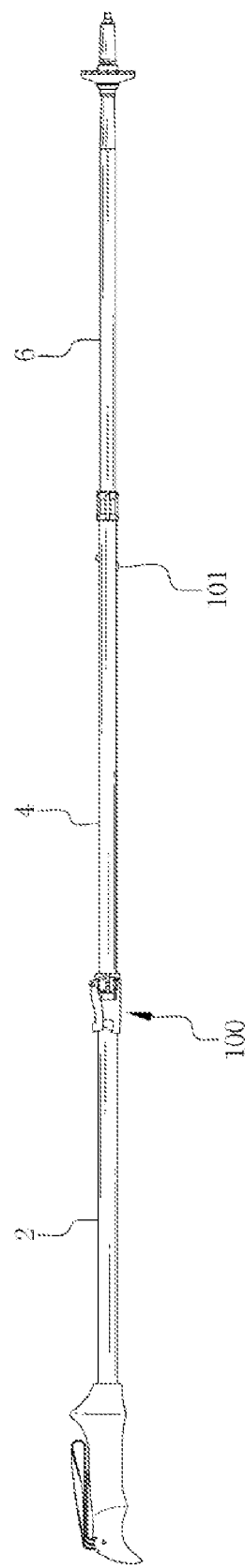
FIG. 11 is a perspective view showing an example of a pole to which the locking device for the pole according to the first embodiment of the present invention is adopted.

FIG. 11 is a perspective view showing an example of a pole to which the locking device according to the first embodiment of the present invention is adopted.

As shown in FIG. 11, the pole is comprised of a plurality of connection tubes 2, 4, 6, . . . , and the connection tube having a relatively large diameter of the two neighboring connection tubes is called 'the upper connection tube', and the other connection tube is called 'the lower connection tube'.

The locking device 100 according to the present invention can be freely mounted on one or more positions of the connection portions of the connection tubes. As shown in FIG. 11, if the connection tubes are three-staged, the locking device 100 is mounted on the connection portion between the upper connection tube 2 and the lower connection tube 4 on the first and second stages of the pole, and the conventional button type locking device 101 is mounted on the connection portion between the upper connection tube 4 and the lower connection tube 6 on the second and third stages of the pole. Alternatively, the locking device 100 according to the present invention is mounted on all of the connection portions on the first and second stages and the second and third stages of the pole.

Figure 12:
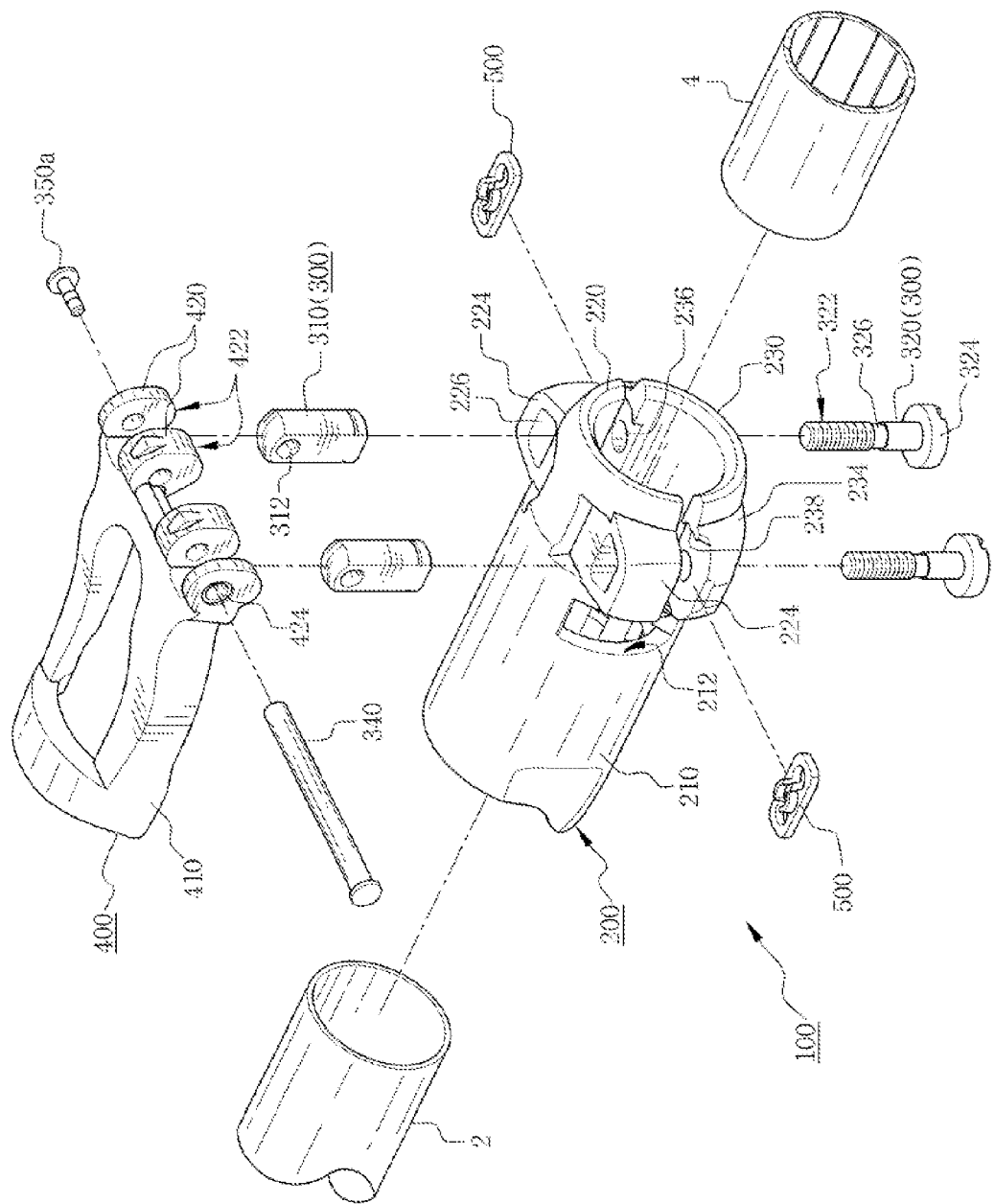
FIG. 12 is an exploded perspective view showing a locking device for a pole according to a second embodiment of the present invention.
Figure 13:
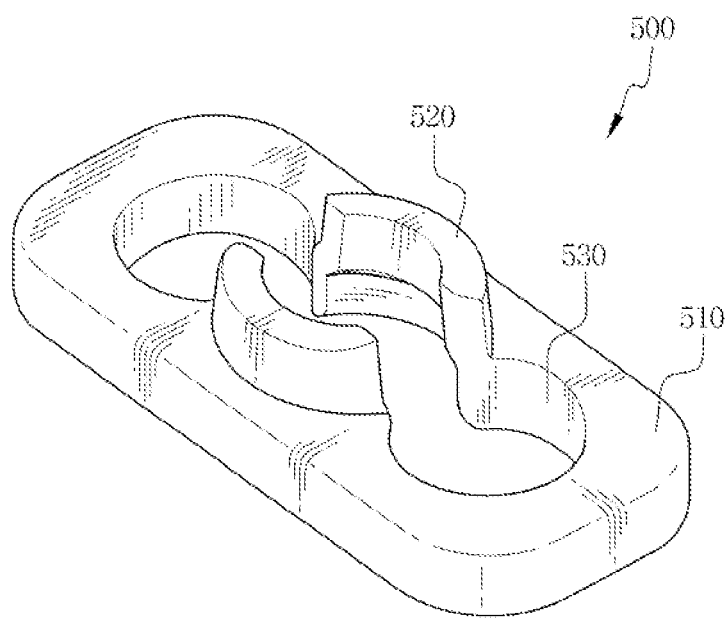
FIG. 13 is a perspective view showing a loosening prevention pad of FIG. 12.
Figure 14:
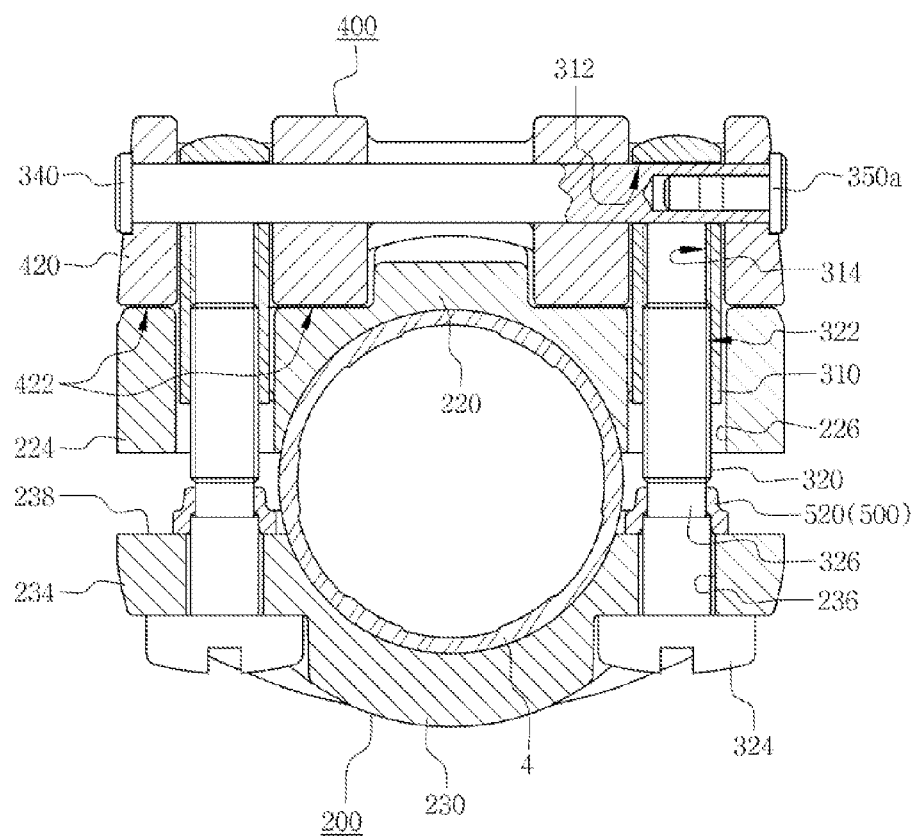
FIG. 14 is a sectional view showing the assembling state wherein the loosening prevention pad is adopted.

FIGS. 12 to 14 show a locking device for a pole according to a second embodiment of the present invention, wherein FIG. 12 is a perspective view thereof, FIG. 13 is a perspective view showing a loosening prevention pad of FIG. 12, and FIG. 14 is a sectional view showing the assembling state wherein the loosening prevention pad is adopted.

According to the second embodiment of the present invention, the configuration is the same as the first embodiment of the present invention, except that operating pins 300 are configured differently from those in the first embodiment of the present invention, loosening prevention pads 500 are additionally provided to fix the operating pins 300 thereto, and the coupling structure between the hinge pin 340 and a fixing pin 350a is different from that in the first embodiment of the present invention.

The loosening prevention pads 500 restrict the adjusting screws 320 coupled to the upper pins 310 so as to prevent the whole lengths of the operating pins 300 from being unexpectedly increased or decreased due the unfastening of the adjusting screws 320 caused by the vibration while in use.

As shown in FIG. 12, the loosening prevention pads 500 are fixed to the top surfaces of the lower pressing parts 234 of the grasping tube 200 in such a manner as to elastically restrict the outer peripheral surfaces of the adjusting screws 320 passed therethrough.

At this time, each adjusting screw 320 has a separate groove portion 326 formed on the outer peripheral surface thereof, thereby being easily restricted by the loosening prevention pad 500.

So as to allow the loosening prevention pads 500 to be fixed to the top surfaces of the lower pressing parts 234 of the grasping tube 200, according to the second embodiment of the present invention, each lower pressing part 234 has an insertion protrusion 238 formed on both sides thereof so as to fit both side surfaces of each loosening prevention pad 500 thereto.

If the loosening prevention pads 500 are adopted, there is no need to fit the washers 330 (as shown in FIGS. 5 and 6) to the adjusting screws 320.

As shown in FIG. 13, each loosening prevention pad 500 includes a base 510 and elastic protrusions 520 formed in the middle portion of the base 510 to elastically pressurize the outer peripheral surface of each adjusting screw 320. Further, the elastic protrusions 520 have incised holes 530 formed at one sides thereof to provide an elastic force thereto.

According to the second embodiment of the present invention, as shown in FIG. 14, the elastic protrusions 520 of the loosening prevention pads 500 elastically pressurize the outer peripheral surfaces of the adjusting screws 320 coupled to the upper pins 310, thereby preventing the adjusting screws 320 from being arbitrarily rotated, so that the adjusting screws 320 can be maintained in the state of being adjusted to given lengths unless they are adjusted by a user.

On the other hand, according to the second embodiment of the present invention as shown in FIGS. 12 to 14, the fixing pin 350a is press fitted to the hinge pin 340 adapted to couple the upper pins 310 and the axial lever 400.

According to the first embodiment of the present invention, as shown in FIGS. 5 and 6, the fixing screw 350 is screw-coupled to the hinge pin 340, but in addition thereto, according to the second embodiment of the present invention, the fixing pin 350a is press-fitted to the hinge pin 340, which means various configurations may be made.

As set forth in the foregoing, the locking device for the pole according to the present invention has a structure wherein the axial lever is mounted in the lengthwise direction of the pole, while being extended to a required length, thereby obtaining a large locking force with the application of a small force. Further, the axial lever can be extended, without any bending toward the direction of the application of the force, thereby enabling the force applied to the axial lever to be completely transmitted to the grasping tube, with no loss.

Additionally, the grasping tube is divided into two upper and lower semicircular parts, that is, the upper arch-shaped grasping piece and the lower arch-shaped grasping piece, and on the other hand, the cam type axial lever pulls the operating pins from the left and right sides in the radial direction to clamp the upper arch-shaped grasping piece and the lower arch-shaped grasping piece thereagainst, thereby greatly increasing the locking force for the lower connection tube and further applying the locking force to the entire outer peripheral surface of the lower connection tube in uniform and balanced manners.

Moreover, the upper arch-shaped grasping piece and the lower arch-shaped grasping piece, which come into close contact with the lower connection tube, are decreased in their arch lengths to half of the conventional length, and even if a large locking force is applied, they are not easily expanded, thereby allowing the locking force to be sufficiently increased and also improving the durability.

Furthermore, the operating pins and the upper and lower pressing parts are disposed on both sides in the radial direction of the connection tubes, and also, the cam surfaces are rotated in the lengthwise direction of the pole, so that the point of the application of the force is nearer from the center shafts of the connection tubes when compared with the conventional practices, thereby greatly improving the locking force. In this case, also, even if the locking force is increased, the upper and lower pressing parts are not likely to be deformed.

Moreover, the lengths of the operating pins are increased and decreased by means of the screw-coupling of the upper pins and the adjusting screws, thereby making it convenient to adjust the locking force.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A locking device for use with a pole, the pole having a plurality of connection tubes slidably coupled to each other in the lengthwise direction thereof, wherein a lower connection tube (4) having a relatively smaller diameter than an upper connection tube in two neighboring connection tubes is slidably inserted into the upper connection tube (2) in such a manner as to be locked to the upper connection tube (2) or released from the locked state, the locking device comprising:

a grasping tube (200) having a body (210) coupled to an end periphery of the upper connection tube (2), incision portions (222) formed at a left side and a right side in the radial direction in such a manner as to provide an upper arch-shaped grasping piece (220) and a lower arch-shaped grasping piece (230) formed independently on an upper portion and a lower portion thereof, and upper and lower pressing parts (224, 234) extended outwardly from both sides of each of the upper arch-shaped grasping piece (220) and the lower arch-shaped grasping piece (230);

operating pins (300) adapted to be inserted in an up and down direction into through-holes (226, 236) formed on the upper and lower pressing parts (224, 234) formed on both left and right sides of the upper arch-shaped grasping piece (220) and the lower arch-shaped grasping piece (230);

an axial lever (400) having a pressing plate (410) extended in the lengthwise direction of the pole and a cam type hinge part (420) formed on an end portion of the pressing plate (410) in such a manner as to be hinge-coupled to upper protruded end portions of the operating pins (300) to a state of being rotated in the lengthwise direction of the pole, and wherein each operating pin (300) comprises an upper pin (310) adapted to be slidably inserted into the through-holes (226, 236) of the upper and lower pressing parts (224, 234) of the grasping tube (200) in an up and down direction and having upper end portions hinge-coupled to the axial lever (400), and an adjusting screw (320) adapted to be inserted upwardly into the through-holes (226, 236) of the upper and lower pressing parts (224, 234) in such a manner as to be screw-coupled to the upper pin (310), the adjusting screw (320) having a head (324) locked to the lower pressing part (234).

2. The locking device for use with a pole according to claim 1, wherein the grasping tube (200) has loosening prevention pads (500) fixedly disposed to a top surface of the lower pressing parts (234) thereof in such a manner as to elastically restrict an outer peripheral surface of the adjusting screws (320) and to prevent the adjusting screws (320) from being unfastened.

3. The locking device for use with a pole according to claim 2, wherein each loosening prevention pad (500) comprises a base (510) fixed to the top surface of each lower pressing part (234) and elastic protrusions (520) formed in a middle portion of the base (510) to elastically pressurize the outer peripheral surface of each adjusting screw (320).

4. The locking device for use with a pole according to claim 1, wherein the grasping tube (200) has an incised slot (212) formed on the left and right sides between the body (210) and the upper and lower arch-shaped grasping pieces (220, 230).

5. A locking device for use with a pole, the pole having a plurality of connection tubes slidably coupled to each other in the lengthwise direction thereof, wherein a lower connection tube (4) having a relatively smaller diameter than an upper connection tube in two neighboring connection tubes is slidably inserted into the upper connection tube (2) in such a manner as to be locked to the upper connection tube (2) or released from the locked state, the locking device comprising:

a grasping tube (200) having a body (210) coupled to an end periphery of the upper connection tube (2), incision portions (222) formed at a left side and a right side in the radial direction in such a manner as to provide an upper arch-shaped grasping piece (220) and a lower arch-shaped grasping piece (230) formed independently on an upper portion and a lower portion thereof, and upper and lower pressing parts (224, 234) extended outwardly from both sides of each of the upper arch-shaped grasping piece (220) and the lower arch-shaped grasping piece (230), the upper and lower pressing parts (224, 234) formed on each of both left and right sides thereof having through-holes (226, 236) formed to be passed in an up and down direction therethrough;

operating pins (300) each adapted to be inserted in an up and down direction into the through-holes (226, 236) of the upper and lower pressing parts (224, 234); and an axial lever (400) having a pressing plate (410) extended in the lengthwise direction of the pole and a cam type hinge part (420) extended from the pressing plate (410) in such a manner as to be hinge-coupled to upper protruded end portions of the operating pins (300) to a state of being rotated in the lengthwise direction of the pole, and wherein each operating pin (300) comprises an upper pin (310) adapted to be slidably inserted into the through-holes (226, 236) of the upper and lower pressing parts (224, 234) of the grasping tube (200) in an up and down direction and having upper end portions hinge-coupled to the axial lever (400), and an adjusting screw (320) adapted to be inserted upwardly into the through-holes (226, 236) of the upper and lower pressing parts (224, 234) in such a manner as to be screw-coupled to the upper pin (310), the adjusting screw (320) having a head (324) locked to the lower pressing part (234).

6. The locking device for use with a pole according to claim 5, wherein the grasping tube (200) has loosening prevention pads (500) fixedly disposed to a top surface of the lower pressing parts (234) thereof in such a manner as to elastically restrict an outer peripheral surface of the adjusting screws (320) and to prevent the adjusting screws (320) from being unfastened.

7. The locking device for use with a pole according to claim 6, wherein each loosening prevention pad (500) comprises a base (510) fixed to the top surface of each lower pressing part (234) and elastic protrusions (520) formed in a middle portion of the base (510) to elastically pressurize the outer peripheral surface of each adjusting screw (320).

8. The locking device for use with a pole according to claim 5, wherein the grasping tube (200) has an incised slot (212) formed on the left and right sides between the body (210) and the upper and lower arch-shaped grasping pieces (220, 230).

* * * * *